US006405280B1

(12) United States Patent
Ryan

(10) Patent No.: US 6,405,280 B1
(45) Date of Patent: Jun. 11, 2002

(54) PACKET-ORIENTED SYNCHRONOUS DRAM INTERFACE SUPPORTING A PLURALITY OF ORDERINGS FOR DATA BLOCK TRANSFERS WITHIN A BURST SEQUENCE

(75) Inventor: Kevin J. Ryan, Eagle, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/092,548

(22) Filed: Jun. 5, 1998

(51) Int. Cl.⁷ ............................................. G06F 13/16
(52) U.S. Cl. .................. 711/105; 711/104; 711/118; 711/217; 711/218; 711/219
(58) Field of Search ................... 711/105, 104, 711/217, 218, 219, 118

(56) References Cited

U.S. PATENT DOCUMENTS

| 4,095,093 A | 6/1978 | Miles ........................... 377/26 |
| 4,096,402 A | 6/1978 | Schroeder et al. ............. 327/77 |
| 4,404,474 A | 9/1983 | Dingwall ..................... 327/710 |
| 4,611,337 A | 9/1986 | Evans ......................... 377/123 |
| 4,638,187 A | 1/1987 | Boler et al. ................... 326/27 |
| 4,789,796 A | 12/1988 | Foss ............................. 326/27 |
| 4,884,270 A | 11/1989 | Chiu et al. ................... 714/719 |
| 4,928,281 A | 5/1990 | Kurosawa et al. .......... 714/805 |
| 4,933,910 A | 6/1990 | Olson et al. .............. 365/238.5 |
| 4,958,088 A | 9/1990 | Farah-Bakhsh et al. ....... 326/24 |
| 4,984,204 A | 1/1991 | Sato et al. .............. 365/189.11 |
| 5,111,435 A | 5/1992 | Miyamoto ............. 365/230.06 |
| 5,122,690 A | 6/1992 | Bianchi ........................ 326/87 |
| 5,128,560 A | 7/1992 | Chern et al. ................... 326/81 |
| 5,128,563 A | 7/1992 | Hush et al. .................... 326/87 |
| 5,134,311 A | 7/1992 | Biber et al. .................. 327/108 |

(List continued on next page.)

FOREIGN PATENT DOCUMENTS

| EP | 0 450 871 A2 | 10/1991 |
| EP | 0 655 741 A2 | 5/1995 |
| EP | 0 680 049 A2 | 11/1995 |
| EP | 0 692 872 A2 | 1/1996 |
| JP | 2-112317 | 4/1990 |
| JP | 4-135311 | 8/1992 |
| JP | 5-136664 | 1/1993 |
| JP | 5-282868 | 10/1993 |
| WO | 97/03445 | 1/1997 |
| WO | 97/14289 | 4/1997 |
| WO | 97/15055 | 4/1997 |

OTHER PUBLICATIONS

Taguchi, M. et al., "A 40–ns 64–Mb DRAM with 64–b Parallel Data Bus Architecture", IEEE Journal of Solid–State Circuits, vol. 26, Nov. 1991, pp. 1493–1497.

Primary Examiner—Reginald G. Bragdon
(74) Attorney, Agent, or Firm—Dorsey & Whitney LLP

(57) ABSTRACT

A system and method for providing a burst sequence of data in a desired data ordering in response to a request packet. The burst sequence of data includes a plurality of data blocks and the request packet includes one or more data ordering bits which define a data ordering. The system includes one or more random access memory modules. Each random access memory module includes a memory array having a plurality of memory cells organized in an array of rows and columns, a row address decoder connected to the memory array for generating a row address which addresses one of the rows of the memory array, and a column address decoder connected to the memory array for generating a column address which addresses one of the columns of the memory array. The column address decoder includes data ordering control logic for placing data blocks retrieved from the memory array within the burst sequence as a function of the data ordering bits in the request packet such that consecutive burst sequences can be transferred in different data orderings.

29 Claims, 5 Drawing Sheets

U.S. PATENT DOCUMENTS

| | | | |
|---|---|---|---|
| 5,150,186 A | 9/1992 | Pinney et al. | 326/87 |
| 5,165,046 A | 11/1992 | Hesson | 327/111 |
| 5,170,074 A | 12/1992 | Aoki | 327/203 |
| 5,179,298 A | 1/1993 | Hirano et al. | 326/83 |
| 5,194,765 A | 3/1993 | Dunlop et al. | 326/87 |
| 5,220,208 A | 6/1993 | Schenck | 326/37 |
| 5,239,206 A | 8/1993 | Yanai | 327/202 |
| 5,254,883 A | 10/1993 | Horowitz et al. | 326/30 |
| 5,274,276 A | 12/1993 | Casper et al. | 326/21 |
| 5,276,642 A | 1/1994 | Lee | 365/189.04 |
| 5,278,460 A | 1/1994 | Casper | 327/546 |
| 5,281,865 A | 1/1994 | Yamashita et al. | 327/208 |
| 5,303,364 A | 4/1994 | Mayer et al. | 711/140 |
| 5,311,481 A | 5/1994 | Casper et al. | 365/230.06 |
| 5,321,368 A | 6/1994 | Hoelzle | 327/218 |
| 5,347,177 A | 9/1994 | Lipp | 326/30 |
| 5,347,179 A | 9/1994 | Casper et al. | 326/122 |
| 5,361,002 A | 11/1994 | Casper | 327/530 |
| 5,383,157 A | 1/1995 | Phelan | 365/201 |
| 5,387,809 A | 2/1995 | Yamagishi et al. | 257/203 |
| 5,390,308 A | 2/1995 | Ware et al. | 711/5 |
| 5,400,283 A | 3/1995 | Raad | 365/203 |
| 5,438,545 A | 8/1995 | Sim | 365/189.05 |
| 5,440,260 A | 8/1995 | Hayashi et al. | 327/278 |
| 5,457,407 A | 10/1995 | Shu et al. | 326/30 |
| 5,467,473 A | 11/1995 | Kahle et al. | 712/23 |
| 5,471,591 A | 11/1995 | Edmondson et al. | 712/217 |
| 5,473,575 A | 12/1995 | Farmwald et al. | 365/230.06 |
| 5,475,642 A | 12/1995 | Taylor | 365/203 |
| 5,481,497 A | 1/1996 | Yamauchi et al. | 365/189.05 |
| 5,483,497 A | 1/1996 | Mochizuki et al. | 365/230.06 |
| 5,497,127 A | 3/1996 | Sauer | 331/17 |
| 5,498,990 A | 3/1996 | Leung et al. | 327/323 |
| 5,506,814 A | 4/1996 | Hush et al. | 365/230.03 |
| 5,508,638 A | 4/1996 | Cowles et al. | 326/38 |
| 5,513,327 A | 4/1996 | Farmwald et al. | 710/129 |
| 5,537,352 A | 7/1996 | Meyer et al. | 365/189.02 |
| 5,568,077 A | 10/1996 | Sato et al. | 327/199 |
| 5,574,698 A | 11/1996 | Raad | 365/230.06 |
| 5,576,645 A | 11/1996 | Farwell | 327/94 |
| 5,578,941 A | 11/1996 | Sher et al. | 326/34 |
| 5,581,197 A | 12/1996 | Motley et al. | 326/30 |
| 5,590,073 A | 12/1996 | Arakawa et al. | 365/185.08 |
| 5,619,473 A | 4/1997 | Hotta | 365/238.5 |
| 5,621,690 A | 4/1997 | Jungroth et al. | 365/200 |
| 5,627,780 A | 5/1997 | Malhi | 365/185.09 |
| 5,627,791 A | 5/1997 | Wright et al. | 365/222 |
| 5,631,872 A | 5/1997 | Naritake et al. | 365/227 |
| 5,636,163 A | 6/1997 | Furutani et al. | 365/189.01 |
| 5,636,173 A | 6/1997 | Schaefer | 365/230.03 |
| 5,636,174 A | 6/1997 | Rao | 365/230.03 |
| 5,638,335 A | 6/1997 | Akiyama et al. | 365/230.03 |
| 5,650,971 A | 7/1997 | Longway et al. | 365/207 |
| 5,655,105 A | 8/1997 | McLaury | 711/169 |
| 5,668,763 A | 9/1997 | Fujioka et al. | 365/200 |
| 5,682,342 A | 10/1997 | Suzuki | 708/672 |
| 5,694,065 A | 12/1997 | Hamasaki et al. | 327/108 |
| 5,737,276 A | 4/1998 | Shin et al. | 365/230.08 |
| RE35,934 E | 10/1998 | Takai | 365/230.06 |
| 5,831,929 A | 11/1998 | Manning | 365/233 |
| 5,847,577 A | 12/1998 | Trimberger | 326/38 |
| 5,854,911 A | 12/1998 | Watkins | 712/207 |
| 5,870,347 A | 2/1999 | Keeth et al. | 365/230.03 |
| 5,905,874 A | 5/1999 | Johnson | 709/250 |
| 5,923,594 A | 7/1999 | Voshell | 365/189.05 |
| 5,946,245 A | 8/1999 | Brown et al. | 365/201 |
| 5,956,502 A | 9/1999 | Manning | 713/503 |
| 6,014,759 A | 1/2000 | Manning | 714/42 |
| 6,023,177 A | 2/2000 | Kim et al. | 327/142 |
| 6,035,393 A | 3/2000 | Glew et al. | 712/237 |
| 6,044,429 A | 3/2000 | Ryan et al. | 710/131 |
| 6,081,476 A * | 6/2000 | Hotta | 365/233 |
| 6,088,280 A * | 7/2000 | Vogley et al. | 365/221 |
| 6,088,774 A | 7/2000 | Gillingham | 711/167 |
| 6,091,646 A | 7/2000 | Voshell | 365/189.05 |

* cited by examiner

| $2^Y$ BURST LENGTH (IN CPU WORDS) | STARTING WORD ADDRESS: | | | ORDER OF ACCESSES WITHIN A BURST | |
|---|---|---|---|---|---|
| | | | | TYPE=SEQUENTIAL | TYPE=INTERLEAVED |
| 2 | | | A0 | | |
| | | | 0 | 0-1 | 0-1 |
| | | | 1 | 1-0 | 1-0 |
| 4 | | A1 | A0 | | |
| | | 0 | 0 | 0-1-2-3 | 0-1-2-3 |
| | | 0 | 1 | 1-2-3-0 | 1-0-3-2 |
| | | 1 | 0 | 2-3-0-1 | 2-3-0-1 |
| | | 1 | 1 | 3-0-1-2 | 3-2-1-0 |
| 8 | A2 | A1 | A0 | | |
| | 0 | 0 | 0 | 0-1-2-3-4-5-6-7 | 0-1-2-3-4-5-6-7 |
| | 0 | 0 | 1 | 1-2-3-4-5-6-7-0 | 1-0-3-2-5-4-7-6 |
| | 0 | 1 | 0 | 2-3-4-5-6-7-0-1 | 2-3-0-1-6-7-4-5 |
| | 0 | 1 | 1 | 3-4-5-6-7-0-1-2 | 3-2-1-0-7-6-5-4 |
| | 1 | 0 | 0 | 4-5-6-7-0-1-2-3 | 4-5-6-7-0-1-2-3 |
| | 1 | 0 | 1 | 5-6-7-0-1-2-3-4 | 5-4-7-6-1-0-3-2 |
| | 1 | 1 | 0 | 6-7-0-1-2-3-4-5 | 6-7-4-5-2-3-0-1 |
| | 1 | 1 | 1 | 7-0-1-2-3-4-5-6 | 7-6-5-4-3-2-1-0 |

*Fig. 3*

| A | C | T1 | D | T2 | E | T3 |
|---|---|---|---|---|---|---|
| 64 | 128 | 2 | 8 | 8 | 64 | 8 |
| 64 | 128 | 2 | 8 | 8 | 128 | 16 |
| 64 | 128 | 2 | 16 | 4 | 64 | 4 |
| 64 | 128 | 2 | 16 | 4 | 128 | 8 |
| 64 | 128 | 2 | 32 | 2 | 64 | 2 |
| 64 | 128 | 2 | 32 | 2 | 128 | 4 |
| 64 | 128 | 2 | 64 | 1 | 64 | 1 |
| 64 | 128 | 2 | 64 | 1 | 128 | 2 |
| 64 | 256 | 4 | 8 | 8 | 64 | 8 |
| 64 | 256 | 4 | 8 | 8 | 128 | 16 |
| 64 | 256 | 4 | 16 | 4 | 64 | 4 |
| 64 | 256 | 4 | 16 | 4 | 128 | 8 |
| 64 | 256 | 4 | 32 | 2 | 64 | 2 |
| 64 | 256 | 4 | 32 | 2 | 128 | 4 |
| 64 | 256 | 4 | 64 | 1 | 64 | 1 |
| 64 | 256 | 4 | 64 | 1 | 128 | 2 |
| 64 | 512 | 8 | 8 | 8 | 64 | 8 |
| 64 | 512 | 8 | 8 | 8 | 128 | 16 |
| 64 | 512 | 8 | 16 | 4 | 64 | 4 |
| 64 | 512 | 8 | 16 | 4 | 128 | 8 |
| 64 | 512 | 8 | 32 | 2 | 64 | 2 |
| 64 | 512 | 8 | 32 | 2 | 128 | 4 |
| 64 | 512 | 8 | 64 | 1 | 64 | 1 |
| 64 | 512 | 8 | 64 | 1 | 128 | 2 |

*Fig. 4*

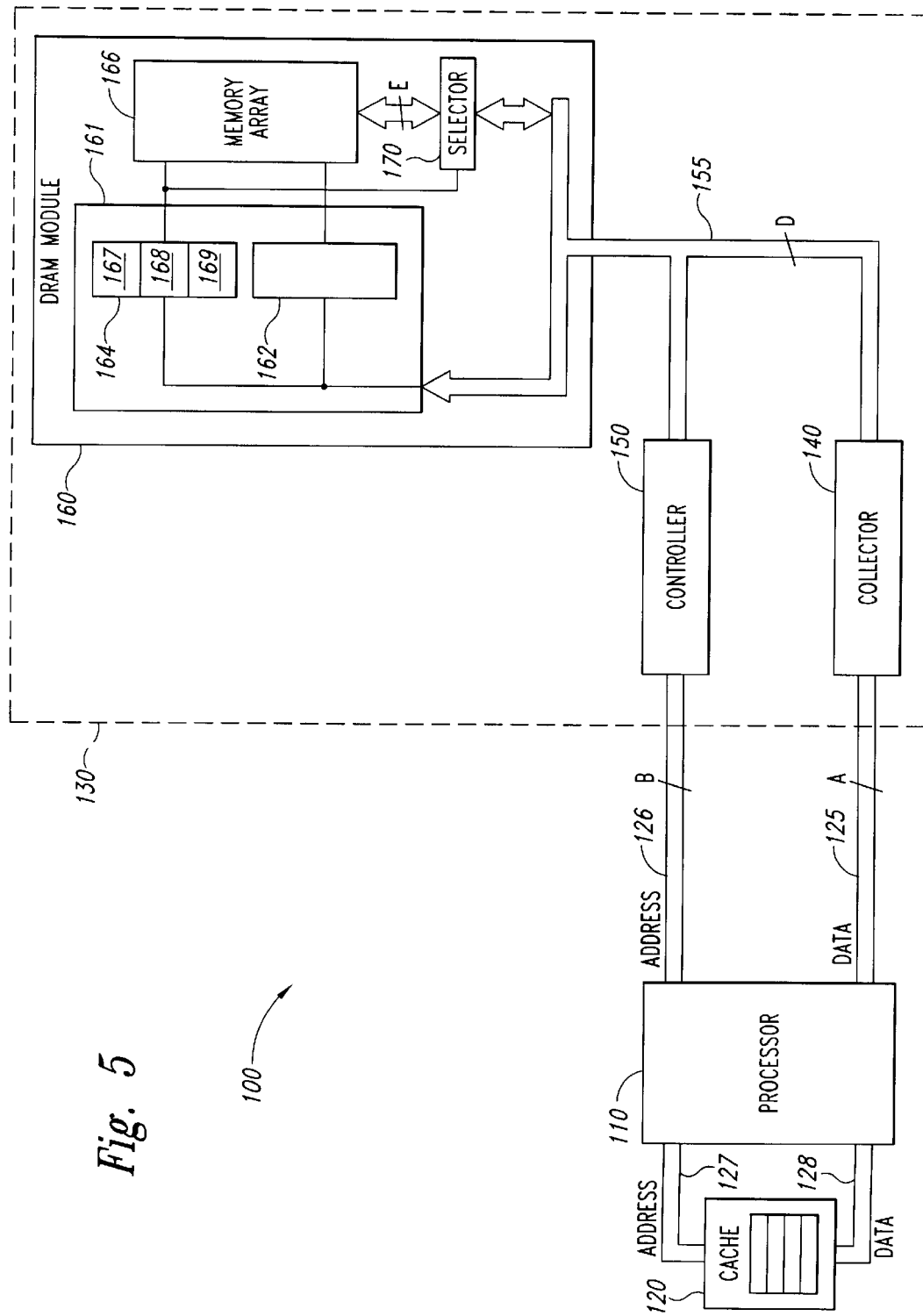

PACKET-ORIENTED SYNCHRONOUS DRAM INTERFACE SUPPORTING A PLURALITY OF ORDERINGS FOR DATA BLOCK TRANSFERS WITHIN A BURST SEQUENCE

BACKGROUND OF THE INVENTION

1. Field of the Invention

The present invention relates generally to packet-oriented interfaces for synchronous DRAMs, and more particularly to a method and apparatus for supporting a plurality of orderings for data block transfers within a burst sequence.

2. Background Information

A microprocessor-based system utilizes a memory system having several memory devices for storing information. One such memory device common in standard memory systems is the dynamic random access memory (DRAM). In certain microprocessor-based systems, a high-speed, synchronous bus such as RAMBUS is used to transfer information to the DRAMs. Typically, the synchronous bus is capable of transferring eight data bits simultaneously. In order to facilitate high-speed data exchange between the microprocessor and the DRAMs, a memory controller acts a master for the bus and manages a high-level packet protocol on the synchronous bus.

In order to minimize access to the memory system, a high-speed data cache holds blocks of recently used data. A typical data cache has a plurality of data cache lines, where each data cache line holds a plurality of data blocks for the microprocessor. In the following specification, a data block is the amount of bits which can be transferred to the microprocessor in a single transfer. In some situations, a data block may be equivalent to a word or a long word. In most modern processors, the data block is 64 bits, reflecting the size of the data bus.

When the needed data block is not within the data cache, a cache miss occurs and the memory system is accessed in order to retrieve the corresponding data block. In order to further improve performance, the data cache loads an entire data cache line including the requested data block.

Conventional microprocessor-based systems use microprocessors which operate on 64 bit data blocks from the data cache. Furthermore, some such systems utilize data caches with a 32 byte wide data cache line organized as four 64 bit data blocks. Therefore, when a cache miss occurs in a conventional system, four 64 bit data blocks are transferred in a burst sequence from the memory system to the data cache in order to fill the data cache line. Since the memory bus in synchronous memory-based systems is typically capable of transferring 8 bits of data for each clock cycle, 32 clock cycles are needed to fill the entire data cache line, 8 clock cycles for each block data block.

Conventional DRAMs store information in an array format which is accessed by row and a column. In order to accelerate data transfer for non-sequential accesses, some synchronous DRAMs include a separate line over which a tap address is issued serially while the data block of eight bytes is being received. In this manner the memory addressing can jump to any of 256 locations within a particular row and the next non-sequential address is ready before the next block of data is accessed. The transfer rate of the data blocks of 8 bytes is therefore improved since the subsequent data block can begin transferring immediately upon the finishing of the previous data block.

As faster microprocessors are continually developed, memory systems need to increase data throughput in order to avoid problematic delays. One manner of increasing the data transfer rate of a memory system having DRAMs is to increase the capacity of the memory bus. For example, the capacity of the memory bus could be increased such that 16 bits of data could be transferred simultaneously, thus providing a substantial increase in data throughput. Thus, a data block of 8 bytes could be transferred in 4 clock cycles instead of the 8 clock cycles required in conventional systems. Reducing the number of clock cycles needed to transfer a single data block, however, reduces the size of the tap address which can be transferred. For example, if the bus capacity was doubled to allow 16 bits of data, only four clock cycles would be available to transfer the serial offset for the column address. Thus, only sixteen tap points would be available within an open row. This severely limits efficient transfer of non-sequential data blocks and therefore reduces the data throughput of the memory system. By transmitting the next address serially while a data block is being received, conventional protocols impede an increase in the bus capacity. Therefore, there exists a need in the art for a method and apparatus which facilitates increased bus capacity without restricting the ability to jump within any column within an open row of the DRAM.

Conventional microprocessors, such as microprocessors produced by Intel, require data block transfers in a particular interleaved format. Supporting the particular order required by an Intel processor is traditionally accomplished by transmitting the starting address of the next data block during the transfer of the previous data block. As described earlier, the starting address of the next data block is transmitted serially. Several other conventional microprocessors, however, require data block transfers to be sequential. Synchronous DRAMs exist which support both interleaved and sequential data block ordering; however, these SDRAMs must be reprogrammed each time a different reordering is selected, requiring the memory bus to become inactive and therefore disrupting system activity.

In addition, advanced microprocessor-based systems may contain multiple subsystems which require different data block transfer orderings. For example, a conventional processor may require interleaved data block ordering while another device on the PCI bus may require a linear ordering. This presents a particular problem with conventional DRAMs since conventional DRAMs require reprogramming to switch between block transfer orderings. Reprogramming the DRAM mandates the memory bus be idle over a period of time and therefore introduces delays in the system. There is a need in the art for a method and apparatus which supports various data block transfer orderings, such as interleaved and linear, without requiring reprogramming and which is configurable to support various bus capacities and block transfer sizes.

SUMMARY OF THE INVENTION

A system and method of transferring data between a packet-oriented synchronous memory device and a processor are described. The synchronous memory device includes a column address decoder. The column address decoder includes a sequencer which controls one or more bits of column address. According to one aspect of the invention, request packets are used to access data in the synchronous memory device. Each request packet controls a particular burst sequence and each request packet includes one or more data ordering bits which define a data ordering for the particular burst sequence. One of the plurality of request packets is transferred to the synchronous memory device, where information from the request packet is used to load the sequencer as a function of the data ordering bits in the transferred request packet. Data is then transferred to the processor in the data ordering defined for the burst sequence controlled by the transferred request packet.

According to another aspect of the invention, a random access memory module is described which provides a burst sequence of data in response to a request packet. The burst sequence of data includes a plurality of data blocks and the request packet includes one or more data ordering bits which define a data ordering. The random access memory module includes a memory array having a plurality of memory cells organized in an array of rows and columns, a row address decoder connected to the memory array, wherein the row address decoder generates a row address which addresses one of the rows of the memory array, and a column address decoder connected to the memory array, wherein the column address decoder generates a column address which addresses one of the columns of the memory array. The column address decoder includes data ordering control logic for placing data blocks retrieved from the memory array within the burst sequence as a function of the data ordering bits in the request packet such that consecutive burst sequences can be transferred in different data orderings.

According to yet another aspect of the invention, a memory system is described which provides a plurality of data words in response to a read request, wherein the read request includes an address. The memory system includes a controller, a synchronous random access memory, a collector and a synchronous memory bus connected to the controller, the random access memory and the collector. The controller generates a request packet having one or more data ordering bits which define a data ordering in response to the read request and transfers the request packet over the synchronous memory bus to the random access memory. The synchronous random access memory provides a burst sequence of data over the synchronous memory bus to the collector in the data ordering defined in the request packet and the collector receives the burst sequence of data from the random access memory and forms the burst sequence of data into the plurality of data words.

According to yet another aspect of the invention, a computer system is described which replaces cache lines in a cache with data transferred from a synchronous memory module in any of a number of desired orders.

These and other features and advantages of the invention will become apparent from the following description of the preferred embodiments of the invention.

BRIEF DESCRIPTION OF THE DRAWING

FIG. 3 illustrates the column address sequences generated by the configurable memory system while supporting interleaved addressing for a variety of burst lengths;

FIG. 4 illustrates ordering of data words in an access within one or more column accesses; and FIG. 5 is a block diagram of a microprocessor-based system which supports ordering of data words within one or more column accesses.

DESCRIPTION OF THE PRESENT INVENTION

Figure 1:
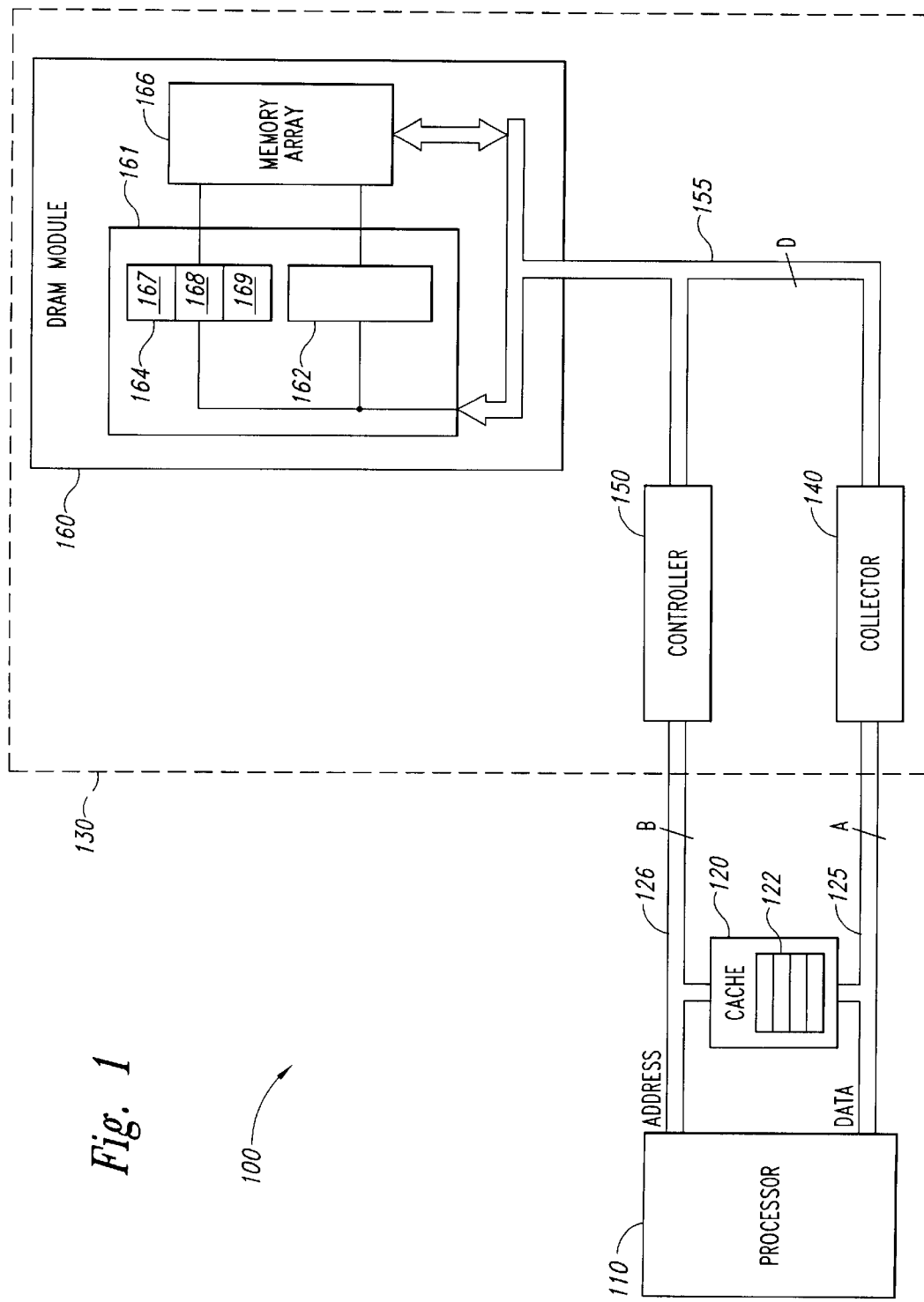
FIG. 1 is a block diagram of a microprocessor-based system which is configurable to allow an increase of bus capacity while supporting various block transfer orderings.

FIG. 1 is a block diagram of a microprocessor-based system which is configurable to allow an increase of bus capacity while supporting various data block transfer orderings. Microprocessor-based system 100 comprises microprocessor 110 which is coupled to data bus 125 and address bus 126. In another embodiment, address and data information of system 100 may be multiplexed on a common bus.

Data cache 120 receives address and data information via data bus 125 and address bus 126 which are A and B bits wide, respectively. In conventional systems, processor 110 operates on data blocks which are 64 bits wide (otherwise known as a long word). Furthermore, conventional systems typically offer 32 addressing lines yielding $2^{32}$ bytes of addressable data storage. Therefore, in one embodiment width A of data bus 125 is 64 bits and width B of address bus 126 is 32 bits.

Date cache 120 is any data cache suitable for maintaining data recently used by processor 110. Data cache 120 contains a plurality of data cache lines 122 each of which hold C bits and are independently swapped. For example, in conventional systems, a data cache line holds 32 bytes (256 bits), the equivalent of four 64 bit data blocks for a conventional microprocessor. When processor 110 requires data and the data is not held in data cache 120, a cache miss occurs and an entire cache data line 122 is retrieved from memory system 130. Thus, cache data line 122 is filled by a series of $T_1$ transfers where $T_1=C/A$.

Figure 2:
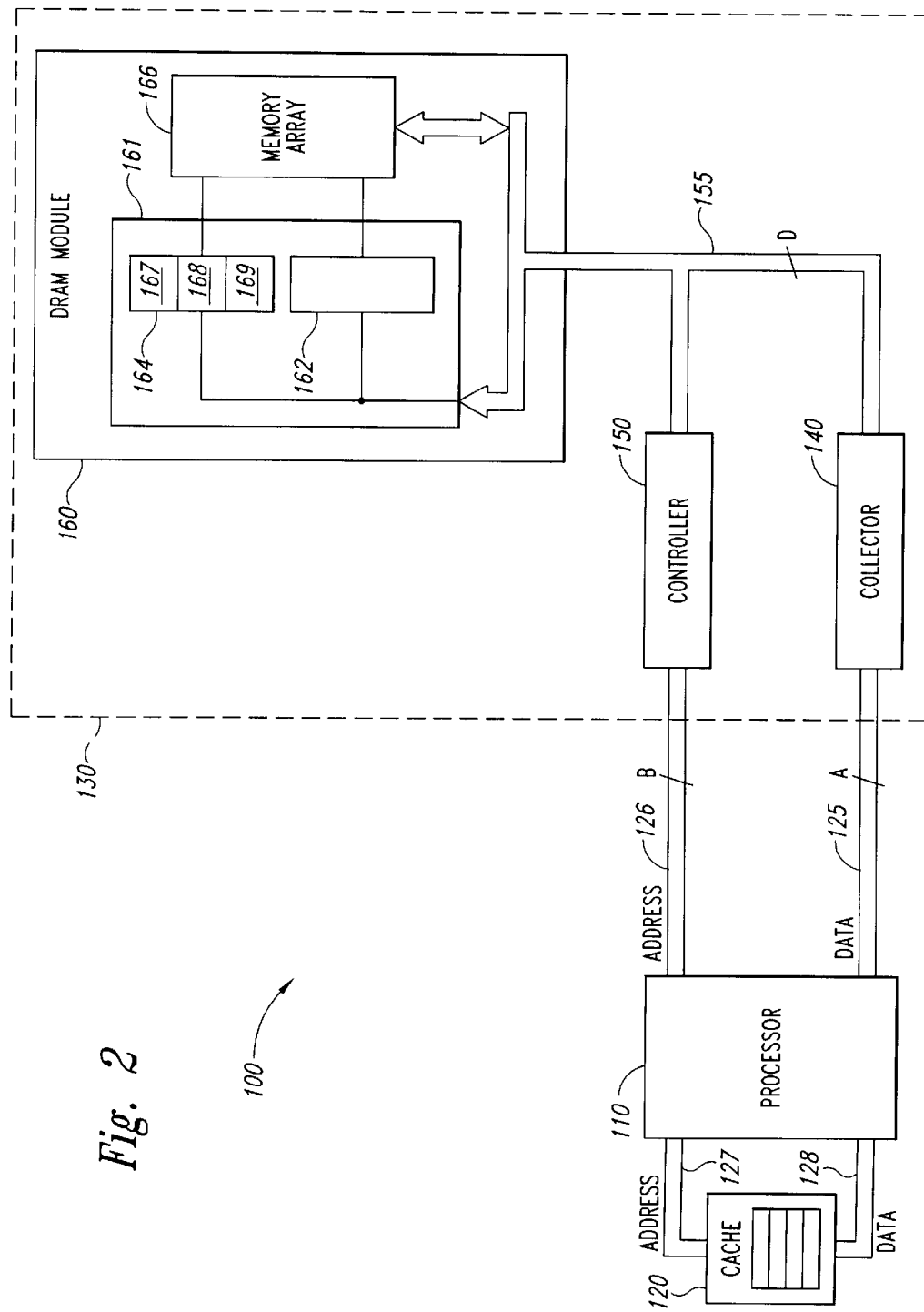
FIG. 2 illustrates another embodiment of the system of FIG. 1.

In another embodiment, as is illustrated in FIG. 2, data cache 120 is connected to a separate address bus 127 and a separate data bus 128. In such an embodiment, processor 110 must direct the cache line data to data cache 120 in the event of a cache line fill.

Controller 150 of memory system 130 receives address requests from bus 126. Controller 150 is coupled to DRAM module 160 by a high-speed, synchronous memory bus 155 which is capable of transferring D bits of data simultaneously. In one embodiment, controller 150 generates a request packet containing a starting address and a desired data ordering in response to an address request received from bus 126. Controller 150 then sends the generated request packet to DRAM module 160 over memory bus 155. In one such embodiment, the request packet is time multiplexed on a common data/address/control bus. In other embodiments, memory bus 155 includes separate data and address/control busses and the request packet is transferred over the address/control bus.

When a data block transfer of A bits is requested, controller 150 initiates $T_2$ transfers of D bits per transfer from DRAM module 160 to collector 140 via memory bus 155. The number of transfer, $T_2$, equals A/D. Collector 140 collects the $T_2$ transfers and forms a single data block of A bits. Each data block is transferred in a single transfer from collector 140 of memory system 130 to data cache 120 via bus 125.

Memory system 100 is illustrated in both FIGS. 1 and 2 as having a single DRAM module 160 which is coupled to memory bus 155. Memory system 100 may, however, comprise any number of banks of DRAM modules without departing from the scope of the present invention. DRAM module 160 includes decoder 161 which decodes the address received from memory bus 155. In one embodiment, decoder 161 receives a request packet from controller 150 and distributes address information to row address decoder 162 and column address decoder 164. The row address and the column address that are generated by row address decoder 162 and column address decoder 164 are then used to access a particular group of memory cells in memory array 166.

In one embodiment, row address decoder 162 of DRAM module 160 is a typical row address decoder as is found in conventional DRAMs. Column address decoder 164 differs from conventional DRAMs or DRAMs, however, in that column address decoder 164 directly supports various orderings of data block transfers without requiring the next address to be serially transmitted. It does this by incorporating a mechanism for sequencing through blocks of addresses in a predetermined order. In one embodiment, for instance, column address decoder 164 of DRAM module 160 includes incrementer 167, sequencer 168, and incrementer 169. Incrementer 169 controls the most significant bits of the column address while incrementer 167 controls the least significant bits. Sequencer 168, on the other hand, controls a number of bits in the middle of the column address. A request packet sent by controller 150 instructs sequencer 164 as to the data ordering desired.

In one embodiment, column address decoder 164 is designed for specific widths of memory bus 155 and data bus 125. In another embodiment, column address decoder 164 is configurable during operation of system 100 and supports different widths of memory bus 155 and data bus 125. It should be noted that, for systems which break a memory address into rows, columns and words within the columns, sequencer 168 may need to extend down into the word addressing bits. For convenience, however, in the remainder of this description, the term "column address" is used in a general way to describe any addressing within the row.

Operation

As described previously, when a cache miss occurs in data cache 120, $T_1$ block transfers are initiated by controller 150 in order to fill data cache line 122. A method of transferring data between a packet-oriented synchronous memory device and a collector such as collector 140 is described next.

As noted above, DRAM module 160 includes a column address decoder 164. In one embodiment, in order to transfer data between module 160 and, through collector 140, to processor 110, controller 150 assembles one or more request packets, wherein each request packet controls a particular burst sequence and wherein each request packet includes one or more data ordering bits which define a data ordering for the particular burst sequence. Controller 150 transfers one of the request packets to module 160 across memory bus 155, where the data ordering bits are used to initialize the sequencer as a function of the data ordering bits transferred in the transferred request packet. The sequencer then changes the column address in order to read data from DRAM module 160 in the desired order. (In one embodiment, as noted above, a separate control and address bus is provided and request packets are transferred across the separate control and address bus to DRAM module 160.) The data is then assembled in collector 140 before being presented to processor 110 or cache 120.

In one embodiment, request packets include data ordering bits used to alternate between linear and interleaved data ordering in consecutive burst sequence transfers. In another embodiment, request packets include bits which vary as a function of system memory bus width or as a function of burst length.

Each block transfer is intercepted by collector 140 which assembles the block transfer into a single data block of A bits wide, the size required by processor 110. The order of the bytes within the data block assembled by collector 140 is unimportant. Therefore, the X least significant bits of the column address generated by column address decoder 164 are not critical and can be determined by $2^X=A$. In order to achieve flexibility, column address decoder 164 is programmable such that incrementer 167 is configured to generate the X least significant bits of the column address. Since the order of the lowest X bits of column address is unimportant, incrementer 167 can linearly increment the bits when generating the next column address.

In contrast, the order of the data blocks transferred to cache 120 from collector 140 via bus 125 is critical and must match the order requested by the microprocessor 110. Thus, Y bits of the column address above the X least significant bits, need to be sequenced according to the selected ordering. In one embodiment, decoder 164 can handle a number of data orderings including linear and interleaved. Other orders may also be used as suitable for processor 110. In one embodiment the particular number of bits, Y, is a function of the number of data blocks needed to fill cache line 122 where $2^Y=C/A$ where A is the width of bus 125 and C is the width in bits of a data cache line of data cache 120. Column address decoder 164 is programmable such that sequencer 168 cycles the Y bits of the column address in the specific order required by processor 110. In this manner, sequencer 168 allow a variety of block transfer orderings. In another embodiment Y is a multiple of the number of data blocks needed to fill cache line 122 (such as $2^Y=NC/A$). In such an embodiment, the order repeats up to N times or the order may consist of a sequence embedded within a sequence.

FIG. 3 illustrates values generated by column address decoder 164 for the Y bits of column address above the X least significant bits of column address for various values of Y. In FIG. 3, column 300 illustrates sequential ordering while column 302 illustrates the result when the system has requested interleaved ordering of data blocks. Other orderings can be created as needed.

The upper Z bits of the column address generated by column address decoder 164 are non-critical to supporting various block transfer orderings. Incrementer 169 linearly increments the Z most significant bits of the column addresses applied to memory array 166. In this manner, incrementer 167, sequencer 168, and incrementer 169 form the next column address for accessing memory array 166. The need for serially transmitting the next column address to the DRAM module is eliminated and does not prohibit an increase in the capacity of memory bus 155.

In one embodiment, incrementer 167, sequencer 168 and incrementer 169 of column address decoder 164 are logical components which are implemented by microcode executing on an internal microcontroller. In other embodiments, incrementer 167, sequencer 168 and incrementer 169, are implemented by other conventional digital design techniques as are known in the art.

Operation of an Embodiment having 16 bit Memory Bus Capacity

In one embodiment, as in conventional systems, processor 110 operates on 64 bits of information and data cache line 122 holds 256 bits. Therefore width A of bus 125 equals 64 and width C of data cache line 122 is 256. In contrast to conventional systems, the capacity of memory bus 155 is 16 bits per transfer. This wider bus represents a substantial increase in transfer rate over the transfer rates of existing synchronous DRAM busses which have 8 bit capacity. Thus, under these assumption, A equals 64, C equals 256, and D equals 16.

In the 16 bit memory bus embodiment, X, the non-critical, least significant bits of the column address, equals 2 since $2^X=A/D$. Thus, incrementer 167 is configured to operate on the lowest 2 bits of the column address. Furthermore, in the 16 bit memory bus embodiment, Y equals 2 since $2^Y=C/A$. Thus, sequencer 168 generates two bits which determine the order of the data blocks transferred to cache 120 in order to support linear, interleaved or any other suitable data block ordering. The remaining most significant bits of the column address, Z, are generated by incrementer 169 and are a function of the size of memory array 166. Assuming that the total number of column address lines applied to the memory array is M, then Z equals M−4.

As required by conventional processors using interleaved ordering, the sequence of addresses depends upon the starting address of the critical bits provided by sequencer 168. Since, in this embodiment, sequencer 168 provides two address bits, four possible starting addresses exist. Therefore, FIG. 3, in row 304, provides four sequences of column addresses generated by column address decoder 164 for a 16 bit memory system. In this embodiment, the lower two bits of the column address are generated by incrementer 167. For all four possible sequences, these bits are incremented linearly. The next two bits, labeled as $A_1$ and $A_0$ in FIG. 3, are sequenced by sequencer 168 so as to support interleaving. The remaining bits (not illustrated in FIG. 3) are generated by incrementer 169 and are incremented in a linear fashion. In this manner, memory system 130 utilizes a 16 bit memory bus 155 yet supports the interleaved ordering required by processor 110.

Operation of an Embodiment having 32 bit Memory Bus Capacity

In another embodiment, processor 110 operates on 64 bits of information but data cache line 122 holds 512 data bits. Therefore width A of bus 125 equals 64 but width C of data cache line 122 is 512. Furthermore, capacity of memory bus 155 is 32 bits per transfer. Thus, under these assumption, A equals 64, C equals 512, and D equals 32.

In the 32 bit memory bus embodiment, X, the non-critical, least significant bits of the column address, equals 1 since $2_X=A/D$. Thus, incrementer 167 is configured to operate on the lowest bit of the column address. In the 32 bit memory bus embodiment, Y equals 3 since $2^Y=C/A$. Thus, sequencer 168 generates three bits of address which determine the order of the data blocks transferred to cache 120. The remaining most significant bits of the column address are generated by incrementer 169 and are a function of the size of memory array 166.

Row 306 of FIG. 3 illustrates the DRAM column address generated by column address decoder 164 for a 32 bit memory bus embodiment for the situations where the system has requested either sequential or interleaved ordering. Since, in this embodiment, sequencer 168 provides three address bits, eight possible starting addresses exist. Therefore, row 306 provides eight sequences of column addresses generated by column address decoder 164 for a 32 bit memory system. As noted above, in this embodiment, the lowest bit of the column address is generated by incrementer 167. Therefore, for all eight possible sequences, the least significant bit alternates between 0 and 1. The next three least significant bits (labeled $A_0$, $A_1$, and $A_2$ in FIG. 3) are sequenced by sequencer 168 in the order specified in the request packet. The remaining bits are generated by incrementer 169 and are incremented in linear fashion. In this manner, memory system 130 utilizes a 32 bit memory bus 155 yet supports interleaved ordering required by processor 110.

In the above two examples, the critical word is selected through the use of the least significant X bits. In situations where the ordering of the words within a CPU bus cycle is not important, these bits can be dropped from the request packet.

In addition, it should be noted that sequencer 168 can always be hard-wired (for the same example, the device can be hard-wired in interleaved mode, where it would always provide the other word in the prefetched column second). Such an approach, however, fails to take advantage of the flexible switching between ordering modes provided by this invention.

Embodiments with a Wide Internal Memory Bus

The ordering of data words in an access may be necessary within a single column access, in addition to being needed for multiple column burst accesses. The table shown in FIG. 4 illustrates this need. The table uses the parameters A, C, D, $T_1$ and $T_2$ defined above and, in addition, introduces two new parameters E (400) and $T_3$ (402). E is defined as the total internal memory bus width (for a given external memory bus width D). For any memory technology which uses a prefetch architecture, E is a multiple of D. For DDR (Double Data Rate) SDRAMs, which use a 2n prefetch, E is 2 times D. For 400/600 MHz data rate SLDRAM, E is 4 times D. For 800 MHz data rate SLDRAM, E is 8 times D. A representative embodiment of such a system is shown in FIG. 5.

In system configurations where E is greater than the CPU bus width A, more than one CPU data word is accessed simultaneously. In this case, the desired one of the group that should be the first external word must be selected (critical word first), and the order in which the remaining words will appear externally must be determined. Internal to the DRAM, the prefetch word size (E) may be considered one column. There is a selector 170 inside the DRAM that receives the E wide prefetch and parcels it out in the desired order externally. So, in these cases, some or all of sequencer 168 described above controls the ordering of data by selector 170. Similarly, in one embodiment, selector 170 acts as an assembler under control of sequencer 168 during write operations.

An example of one such embodiment will be described next. In a situation where D equals 16, E equals 128 and A equals 64, sequencer 168 would go to selector 170 to choose the appropriate 64-bit word within the 128-bit prefetch word (and the address bits Al–An would go to column decoder). Each 64-bit word is broken into 16-bit words for external transfer, but the order of these is not critical, and therefore not externally selectable.

For a burst length of 4 CPU words (which would be the equivalent of that shown in the table for existing SDRAMs), this would be a burst length of 2 for an SLDRAM 800 device, if specified in terms of internal columns, or a burst of 16, if specified in terms of external data words. Other values of A, C, D and E can be handled in similar fashion.

CONCLUSION

Various embodiments of a DRAM module, which directly supports various memory bus capacities and a plurality of transfer orderings of data blocks, have been described. Such a device supports various data block transfer orderings, such as interleaved and linear, without requiring reprogramming and which is configurable to support various bus capacities and block transfer sizes. Furthermore, the described invention is suitable for a complex system which requires a memory system which dynamically supports various data transfer orderings such as interleaved and linear. This application is intended to cover any adaptations or variations of the present invention. It is manifestly intended that this invention be limited only by the claims and equivalents thereof.

What is claimed is:

1. A method of transferring data between a packet-oriented synchronous memory device and a processor, wherein the synchronous memory device includes a column address controller, wherein the column address controller includes a sequencer which controls one or more bits of a column address, the method comprising the steps of:

assembling a plurality of request packets, wherein each request packet controls a particular burst sequence and wherein each request packet includes one ore more data ordering bits set to define a data ordering alternating between linear and interleaved data ordering in consecutive burst sequence transfers;

transferring one of the plurality of request packets to the synchronous memory device;

controlling the sequence as a function of the data ordering bits transferred in the transferred request packet; and transferring the data to the processor in the data ordering defined for the burst sequence controlled by the transferred request packet.

2. The method according to claim 1, wherein the step of assembling the plurality of request packets includes the step of setting bits in the request packets as a function of memory bus width.

3. The method according to claim 1, wherein the step of assembling the plurality of request packets includes the step of setting bits in the request packets as a function of burst length.

4. A random access memory module which provides a burst sequence of data in response to a request packet, wherein the burst sequence of data includes a plurality of data blocks and wherein the request packet includes on or more data ordering bits which define a data ordering, the random access memory module comprising:

a memory array having a plurality of memory cells organized in an array of rows and columns;

a row address decoder connected to the memory array, wherein the row address decoder generates a row address which addresses one of the rows of the memory array; and a column address decoder connected to the memory array, wherein the column address decoder generates a column address which addresses one of the columns of the memory array, wherein the column address decoder includes data ordering control logic for placing data blocks retrieved from the memory array within the burst sequence as a function of the data ordering bits in the request packet such that consecutive burst sequences can be transferred in different data orderings, the data ordering control logic having a sequencer which generates bits of the column address used to achieve the desired data ordering and a first incrementer which generates the most significant bits of the column address.

5. The dynamic random access memory module according to claim 4 wherein column address bits controlled by the sequencer vary as a function of memory bus width.

6. The dynamic random access memory module according to claim 4 wherein column address bits controlled by the sequencer vary as a function of burst length.

7. The dynamic random access memory module according to claim 4 wherein the data ordering control logic further comprises a second incrementer generating the least significant bits of the column address.

8. A memory system which provides a plurality of data words in response to a read request, wherein the read request includes an address, the memory system comprising:

a controller, wherein the controller generates a request packet in response to the read request and wherein the request packet includes one or more data ordering bits which define a data ordering;

a synchronous random access memory;

a collector; and a synchronous memory bus connected to the controller, the random access memory and the collector;

wherein the controller transfers the request packet over the synchronous memory bus to the random access memory on receipt of a read request;

wherein the synchronous random access memory provides a burst sequence of data over the synchronous memory bus to the collector in the data ordering defined in the request packet; and wherein the collector receives the burst sequence of data from the random access memory and forms the burst sequence of data into the plurality of data words.

9. The memory system according to claim 8 wherein the synchronous random access memory includes a random access memory module, wherein the random access memory module comprises:

a memory array having a plurality of memory cells organized in an array of rows and columns;

a row address decoder connected to the memory array, wherein the row address decoder generates a row address which addresses one of the rows of the memory array; and a column address decoder connected to the memory array, wherein the column address decoder generates a column address which addresses one of the columns of the memory array, wherein the column address decoder includes data ordering control logic for placing data blocks retrieved from the memory array within the burst sequence as a function of the data ordering bits in the request packet such that consecutive burst sequences can be transferred in different data orderings.

10. The memory system according to claim 9 wherein the data ordering control logic comprises a sequencer which generates bits of the column address used to achieve the desired data ordering and a first incrementer which generates the most significant bits of the column address.

11. The memory system according to claim 10 wherein column address bits controlled by the sequencer vary as a function of memory bus width.

12. The memory system according to claim 10 wherein column address bits controlled by the sequencer vary as a function of burst length.

13. The dynamic random access memory module according to claim 10 wherein the data ordering control logic further comprises a second incrementer generating the least significant bits of the column address.

14. The memory system according to claim 8 wherein the synchronous random access memory includes a plurality of dynamic random access memory (DRAM) modules, wherein each DRAM module comprises:

a memory array having a plurality of memory cells organized in an array of rows and columns;

a row address decoder connected to the memory array, wherein the row address decoder generates a row address which addresses one of the rows of the memory array; and a column address decoder connected to the memory array, wherein the column address decoder generates a column address which addresses one of the columns of the memory array, wherein the column address decoder includes data ordering control logic for placing data blocks retrieved from the memory array within the burst sequence as a function of the data ordering bits in the request packet such that consecutive burst sequences can be transferred in different data orderings.

15. The memory system according to claim 14 wherein the data ordering control logic comprises a sequencer which generates bits of the column address used to achieve the desired data ordering and a first incrementer which generates the most significant bits of the column address.

16. The memory system according to claim 15 wherein column address bits controlled by the sequencer vary as a function of memory bus width.

17. The memory system according to claim 15 wherein column address bits controlled by the sequencer vary as a function of burst length.

18. The dynamic random access memory module according to claim 15 wherein the data ordering control logic further comprises a second incrementer generating the least significant bits of the column address.

19. A computer system, comprising:
    an address bus;
    a data bus;
    a processor connected to the address bus and the data bus, wherein the processor issues read requests, wherein the read requests include address information;
    a cache connected to the address bus and the data bus, wherein the cache includes cache memory, wherein the cache stores cache lines in said cache memory and wherein the cache attempts to fill read requests from the cache lines stored in the cache memory; and
    a memory module connected to the address bus and the data bus, wherein the memory module includes:
        a controller, wherein the controller generates a request packet in response to the read request when the cache cannot fill the read request from the cache lines stored in the cache memory, wherein the request packet includes the address information and one or more data ordering bits which define a data ordering;
        a synchronous random access memory,
        a collector; and
        a synchronous memory bus connected to the controller, the random access memory and the collector;
    wherein the controller transfers the request packet over the synchronous memory bus to the random access memory;
    wherein the synchronous random access memory provides a burst sequence of data over the synchronous memory bus to the collector in the data ordering defined in the request packet;
    wherein the collector receives the burst sequence of data from the random access memory and forms the burst sequence of data into the plurality of data words; and
    wherein the plurality of data words replace one of the cache lines stored in the cache memory.

20. The memory system according to claim 19 wherein the synchronous random access memory includes a random access memory module, wherein the random access memory module comprises:
    a memory array having a plurality of memory cells organized in an array of rows and columns;
    a row address decoder connected to the memory array, wherein the row address decoder generates a row address which addresses one of the rows of the memory array; and
    a column address decoder connected to the memory array, wherein the column address decoder generates a column address which addresses one of the columns of the memory array, wherein the column address decoder includes data ordering control logic for placing data blocks retrieved from the memory array within the burst sequence as a function of the data ordering bits in the request packet such that consecutive burst sequences can be transferred in different data orderings.

21. The memory system according to claim 20 wherein the data ordering control logic comprises a sequencer which generates bits of the column address used to achieve the desired data ordering and a first incrementer which generates the most significant bits of the column address.

22. The memory system according to claim 19 wherein the synchronous random access memory includes a plurality of dynamic random access memory (DRAM) modules, wherein each DRAM module comprises:
    a memory array having a plurality of memory cells organized in an array of rows and columns;
    a row address decoder connected to the memory array, wherein the row address decoder generates a row address which addresses one of the rows of the memory array; and
    a column address decoder connected to the memory array, wherein the column address decoder generates a column address which addresses one of the columns of the memory array, wherein the column address decoder includes data ordering control logic for placing data blocks retrieved from the memory array within the burst sequence as a function of the data ordering bits in the request packet such that consecutive burst sequences can be transferred in different data orderings.

23. The memory system according to claim 22 wherein the data ordering control logic comprises a sequencer which generates bits of the column address used to achieve the desired data ordering and a first incrementer which generates the most significant bits of the column address.

24. A method of transferring data between a packet-oriented synchronous memory device and a processor, wherein the synchronous memory device includes a column address controller, wherein the column address controller includes a sequencer which controls one or more bits of a column address, the method comprising the steps of:
    assembling a plurality of request packets, including setting bits in the request packets as a function of memory bus width, wherein each request packet controls a particular burst sequence and wherein each request packet includes one ore more data ordering bits which define a data ordering for the particular burst sequence;
    transferring one of the plurality of request packets to the synchronous memory device;
    controlling the sequence as a function of the data ordering bits transferred in the transferred request packet; and
    transferring the data to the processor in the data ordering defined for the burst sequence controlled by the transferred request packet.

25. The method according to claim 24, wherein the step of assembling the plurality of request packets includes the step of setting the data ordering bits to alternate between linear and interleaved data ordering in consecutive burst sequence transfers.

26. The method according to claim 24, wherein the step of assembling the plurality of request packets includes the step of setting bits in the request packets as a function of burst length.

27. A method of transferring data between a packet-oriented synchronous memory device and a processor, wherein the synchronous memory device includes a column address controller, wherein the column address controller includes a sequencer which controls one or more bits of a column address, the method comprising the steps of:

assembling a plurality of request packets, including setting bits in the request packets as a function of burst length, wherein each request packet controls a particular burst sequence and wherein each request packet includes one ore more data ordering bits which define a data ordering for the particular burst sequence;

transferring one of the plurality of request packets to the synchronous memory device;

controlling the sequence as a function of the data ordering bits transferred in the transferred request packet; and transferring the data to the processor in the data ordering defined for the burst sequence controlled by the transferred request packet.

28. The method according to claim 27, wherein the step of assembling the plurality of request packets includes the step of setting the data ordering bits to alternate between linear and interleaved data ordering in consecutive burst sequence transfers.

29. The method according to claim 27, wherein the step of assembling the plurality of request packets includes the step of setting bits in the request packets as a function of memory bus width.

* * * * *

UNITED STATES PATENT AND TRADEMARK OFFICE
CERTIFICATE OF CORRECTION

PATENT NO. : 6,405,280 B1
DATED : June 11, 2002
INVENTOR(S) : Kevin J. Ryan

It is certified that error appears in the above-identified patent and that said Letters Patent is hereby corrected as shown below:

Column 1,
Line 59, reads "throughput" should read -- throughout --

Column 2,
Line 6, reads "throughput" should read -- throughout --
Line 17, reads "throughput" should read -- throughout --

Column 5,
Line 4, reads "DRAMs," should read -- SDRAMs --

Column 6,
Line 21, reads "allow" should read -- allows --
Line 60, reads "assumption" should read -- assumptions --

Column 7,
Line 31, reads "assumption" should read -- assumptions --
Line 35, reads "$2_x=A/D.$" should read -- $2^x=A/D.$ --

Column 9,
Line 29, reads "on" should read -- one --

Signed and Sealed this

Eleventh Day of February, 2003

JAMES E. ROGAN
*Director of the United States Patent and Trademark Office*